United States Patent [19]
Saito

[11] Patent Number: 6,035,830
[45] Date of Patent: Mar. 14, 2000

[54] FUEL INJECTION SYSTEM FOR OUTBOARD MOTOR

[75] Inventor: Chitoshi Saito, Hamamatsu, Japan

[73] Assignee: Sanshin Kogyo Kabushiki Kaisha, Hamamatsu, Japan

[21] Appl. No.: 09/034,796

[22] Filed: Mar. 3, 1998

[30] Foreign Application Priority Data

Mar. 3, 1997 [JP] Japan ................................... 9-047663

[51] Int. Cl.$^7$ .............................................. F02M 37/04
[52] U.S. Cl. ........................................... 123/457; 123/516
[58] Field of Search ................................ 123/458, 195 P, 123/456, 516, 457, 459, 497

[56] References Cited

U.S. PATENT DOCUMENTS

| | | | |
|---|---|---|---|
| 5,085,193 | 2/1992 | Morikawa | 123/458 |
| 5,313,924 | 5/1994 | Regueiro | 123/458 |
| 5,367,999 | 11/1994 | King et al. | 123/458 |
| 5,425,342 | 6/1995 | Ariga | 123/456 |
| 5,579,740 | 12/1996 | Cotton et al. | 123/516 |
| 5,598,817 | 2/1997 | Igarashi et al. | 123/179.17 |
| 5,598,827 | 2/1997 | Kato | 123/518 |
| 5,617,821 | 4/1997 | Tsunoda et al. | 123/195 P |
| 5,749,345 | 5/1998 | Treml | 123/457 |
| 5,758,622 | 6/1998 | Rembold et al. | 123/456 |
| 5,785,025 | 7/1998 | Yoshiume et al. | 123/458 |
| 5,890,472 | 4/1999 | Saito | 123/516 |
| 5,894,831 | 4/1999 | Takahashi et al. | 123/195 P |

*Primary Examiner*—Thomas N. Moulis
*Attorney, Agent, or Firm*—Knobbe, Martens, Olson & Bear, LLP

[57] ABSTRACT

A fuel injection system for supplying fuel from a fuel source to an internal combustion engine having at least one combustion chamber, the engine preferably powering an outboard motor, is disclosed. The fuel injection system comprises at least one fuel injector for supplying fuel to the combustion chamber of the engine, a pump delivering fuel at high pressure to at least one fuel rail arranged to deliver fuel under high pressure to the at least one fuel injector, a pressure sensor for detecting a pressure of the fuel in the fuel rail, and a valve controlling a by-pass passage through which a portion of the fuel pumped by the pump may be selectively diverted away from the fuel rail, based upon the fuel pressure detected by the pressure sensor.

10 Claims, 10 Drawing Sheets

FUEL INJECTION SYSTEM FOR OUTBOARD MOTOR

FIELD OF THE INVENTION

The present invention is a fuel injection system for an internal combustion engine of the type used to power the water propulsion device of an outboard motor.

BACKGROUND OF THE INVENTION

Internal combustion engines operating on a two-cycle principal have traditionally been arranged so that fuel is delivered into an incoming air supply. The fuel and air mixture passes into a crankcase chamber for crankcase compression, and is then delivered through a scavenge passage to a combustion chamber of the engine for combustion therein.

As is well known, in the operating cycle of a two-cycle engine, an exhaust port leading from the combustion chamber is open during at least part of the time the scavenge passage is open. Thus, exhaust along with a portion of the air and fuel charge delivered through the scavenge passage flows through the exhaust port into the exhaust system.

In this arrangement, and especially at low engine speeds, a large amount of fuel must be added to the air to compensate for the flow of fuel through the cylinder and directly out the exhaust port. Supplying excessive fuel, however, is costly and can result in stalling of the engine. In addition, the quantities of fuel flowing into the exhaust may foul a catalyst positioned in the exhaust system.

As one attempt to solve the above-stated problems, some two-cycle engines are arranged to have fuel directly injected into the combustion chamber. A fresh air charge is supplied to each combustion chamber through the crankcase and a scavenge port. Once air is supplied to the combustion chamber and the exhaust port is closed, a fuel injector injects fuel directly into the combustion chamber for mixing with the air.

This arrangement has the benefit that little of the fuel flows unburned into the exhaust system, and the amount of fuel supplied to each combustion chamber may be more closely controlled. In many instances, these injectors are of the pressure activated type, where the injector valve only opens when the pressure of the fuel being supplied is high enough. Thus, these systems have a fuel supply which includes a fuel tank and a high pressure pump for pumping fuel from the tank and supplying it under high pressure to the fuel injector.

One problem with these systems is that the pressure of the fuel in the system must be accurately controlled in order to control the injection timing and duration. An electrically operated high pressure pump of variable speed may be used for this purpose. This arrangement, however, requires a complex control for the pump. In addition, the electrically powered pump is susceptible to failure, especially when operated in high temperature environments, such as in the cowling of an outboard motor. An additional problem is that the heat generated by the pump increases the temperature of the fuel and makes more likely the inclusion of vapor within the system.

A mechanical pump is more reliable in this type of environment. Such a pump, however, is driven at speed which corresponds to the speed of the engine. Thus, if the pump is arranged to provide sufficient fuel at a pressure which will open the injectors when the engine is at low speed, when the engine reaches higher speeds, the pump is likely to provide fuel at much too high of a pressure. At the high speeds, fuel is then delivered too long and/or in too great of a quantity. In addition, the high pressure within the fuel system may result in fuel leaks.

A fuel injection system for delivering fuel from a fuel source to a combustion chamber of an engine through a fuel injector which overcomes the above-stated problems is desired.

SUMMARY OF THE INVENTION

In accordance with the present invention, there is provided a fuel injection system for supplying fuel from a fuel source to an internal combustion engine having at least one combustion chamber. Preferably, the engine is utilized to power the water propulsion device of an outboard motor.

The fuel injection system comprises at least one fuel injector for supplying fuel to the combustion chamber of the engine, a pump delivering fuel at high pressure to at least one fuel rail arranged to deliver fuel under high pressure to the at least one fuel injector, a pressure sensor for detecting a pressure of the fuel in the fuel rail, and a valve associated with a by-pass passage for selectively diverting a portion of the fuel pumped by the pump based upon the fuel pressure detected by the pressure sensor.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

Figure 1:
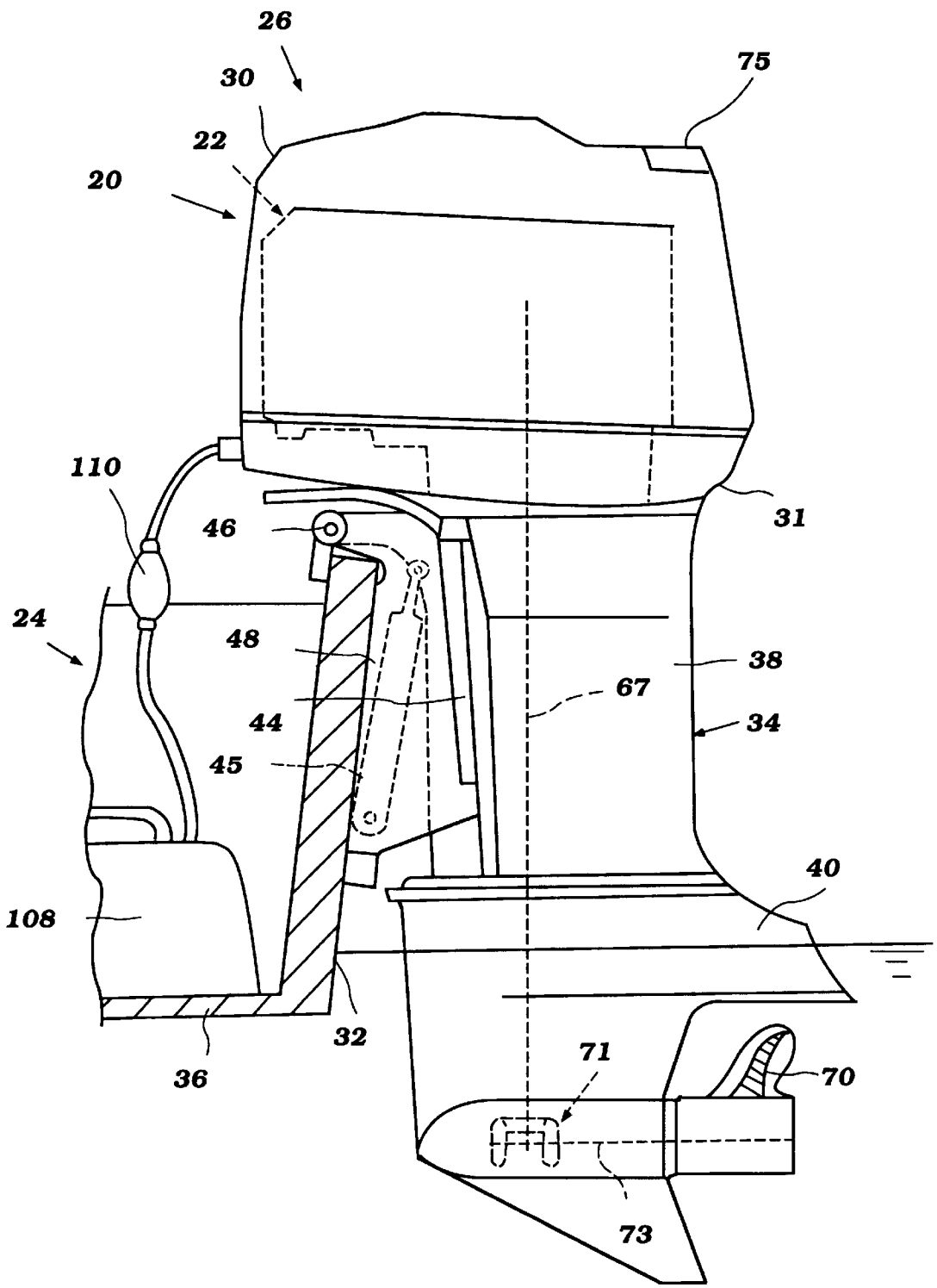
FIG. 1 is a side elevational view of an outboard motor propelling a watercraft, the watercraft illustrated partially and in cross-section, the motor powered by an engine of the type with which the fuel injection system of the present invention is useful.
Figure 2:
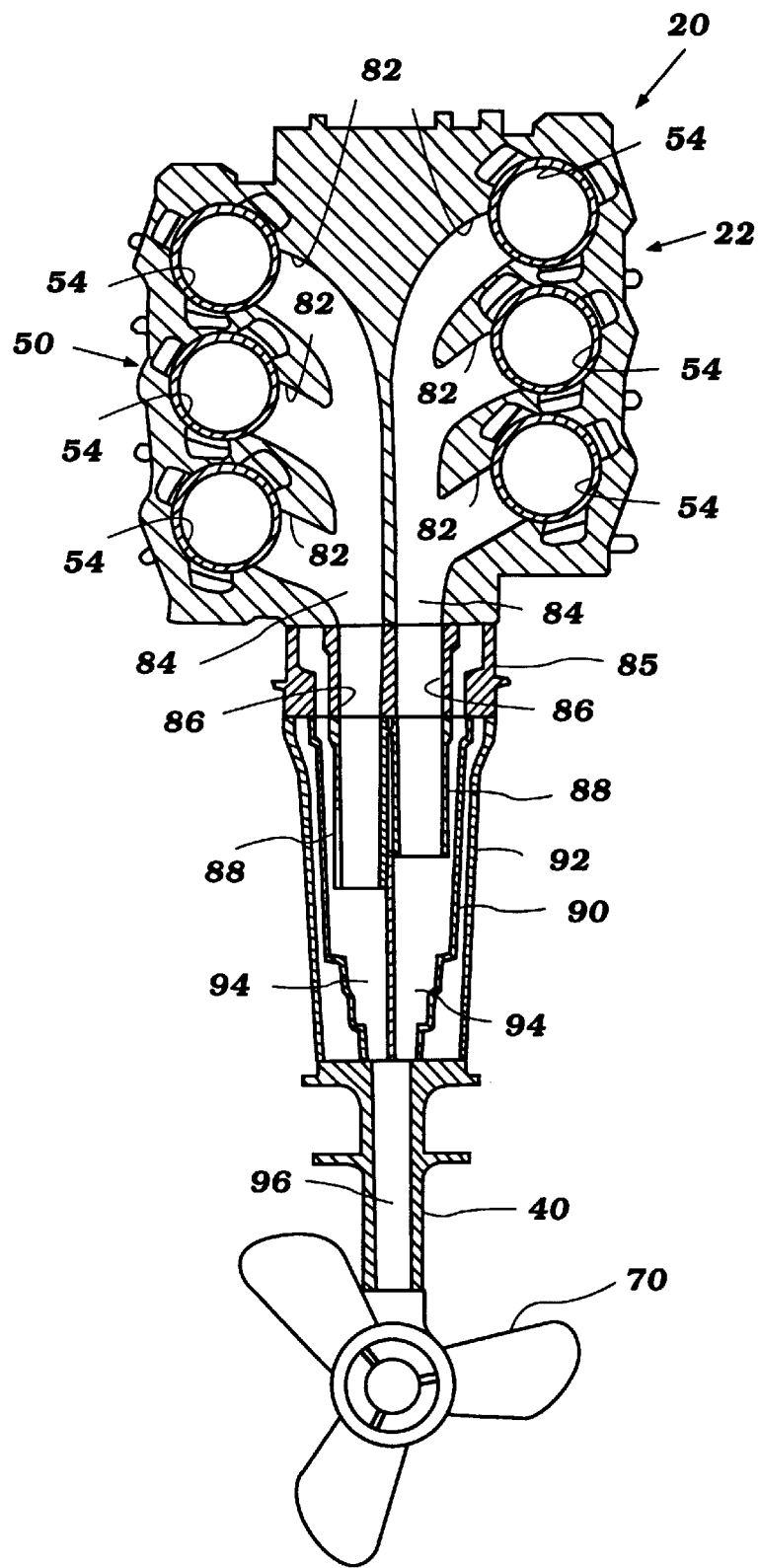
FIG. 2 is a cross-sectional view of the engine powering the motor illustrated in FIG. 1.

Referring to FIG. 1, there is illustrated an engine 22 of the type with which the fuel injection system of the present invention is useful. As illustrated, the engine 22 is preferably used to power an outboard motor 20. The engine 22 having the fuel injection system is described for use with an outboard motor 20 since this is an application for which the invention has particular utility. It will be understood to those of skill in the art however, that the fuel injection system may be used in other applications.

As illustrated in FIG. 1, the outboard motor 20 is of the type utilized to propel a watercraft 24. The outboard motor 20 has a powerhead area 26 comprised of a lower tray portion 28 and a main cowling portion 30. The motor 20 includes a lower unit 34 extending downwardly from the cowling portion 30. The lower unit 34 comprises an upper or "drive shaft housing" section 38 and a lower section 40. A skirt 31 is provided between the main cowling portion 30 and lower unit 34.

The powerhead area 26 of the motor 20 is connected to a steering shaft (not shown). The steering shaft is supported for steering movement about a vertically extending axis within a swivel or steering bracket 44. The swivel bracket 44 is connected by means of a pivot pin 46 to a clamping bracket 48 which is attached to a transom portion 32 of a hull 36 of the watercraft 24. The pivot pin 46 permits the outboard motor 20 to be trimmed and tilted up about the horizontally disposed axis formed by the pivot pin 46. An oil filled cylinder 45 may be used to assist in this movement.

The engine 22 is positioned within the cowling 30 of the motor 20. Referring to FIGS. 2–6, the engine 22 is preferably of the six-cylinder variety, operating on a two-cycle principle, and arranged in "V" fashion. In this arrangement, the engine 22 has a cylinder block 50 with a pair of cylinder heads 52 connected thereto. Each cylinder head 52 cooperates with the block 50 to define three cylinders 54. A combustion chamber 56 is defined within each cylinder 54, preferably partly by a recessed area within the cylinder head 52.

It should be understood that the fuel injection system of the present invention is useful with engines arranged in other orientations and containing other than six cylinders.

Figure 3:
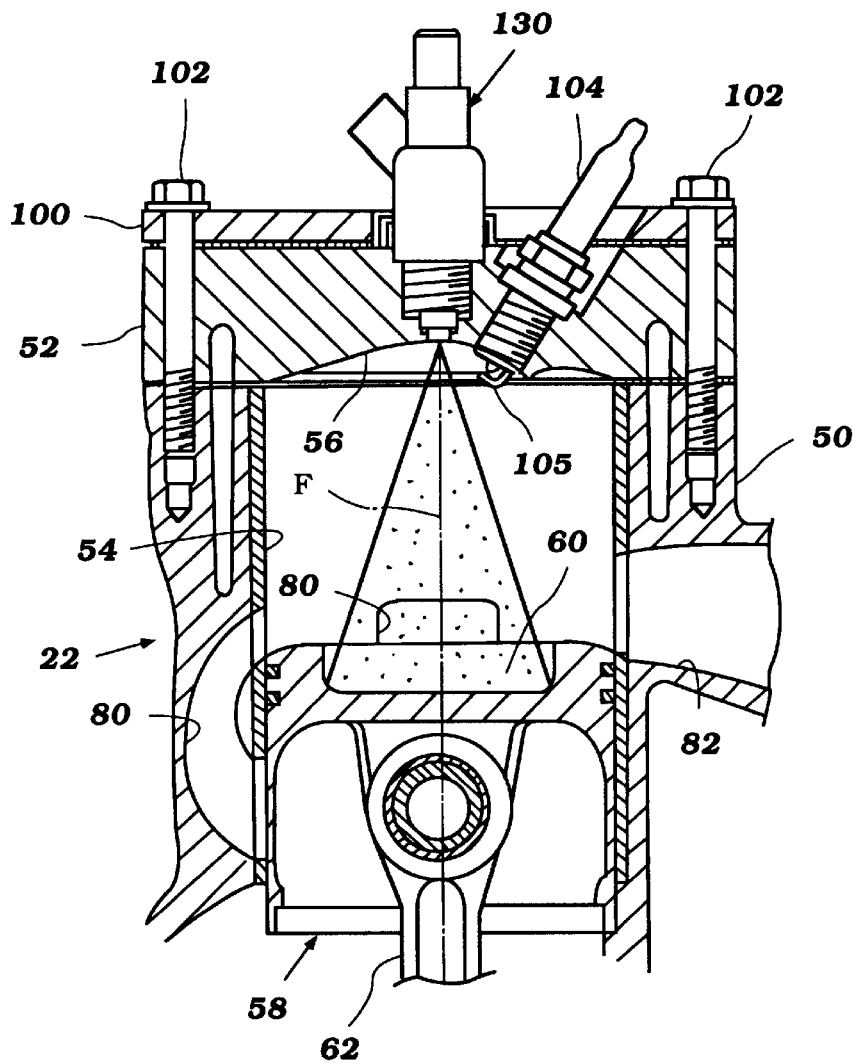
FIG. 3 is an enlarged cross-sectional view of a cylinder of the engine illustrated in FIG. 1.
Figure 4:
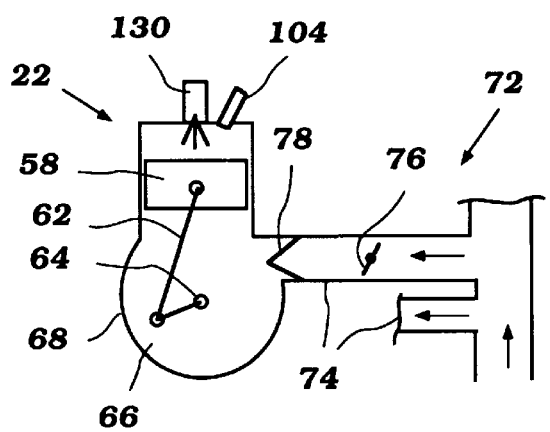
FIG. 4 is a schematic illustrating the arrangement of the engine illustrated in FIG. 1.

Referring to FIGS. 3 and 4, a piston 58 is movably mounted within each cylinder 54. The piston 58 preferably has a recessed top surface area 60 of a shape known to those skilled in the art for inducing fuel and air mixing within the cylinder 54. The piston 58 is connected by a connecting rod 62 to a crankshaft 64. The crankshaft 64 is rotatably mounted in a crankcase 66 defined by the engine block 50 and a crankcase cover 68 connected thereto.

Figure 6:
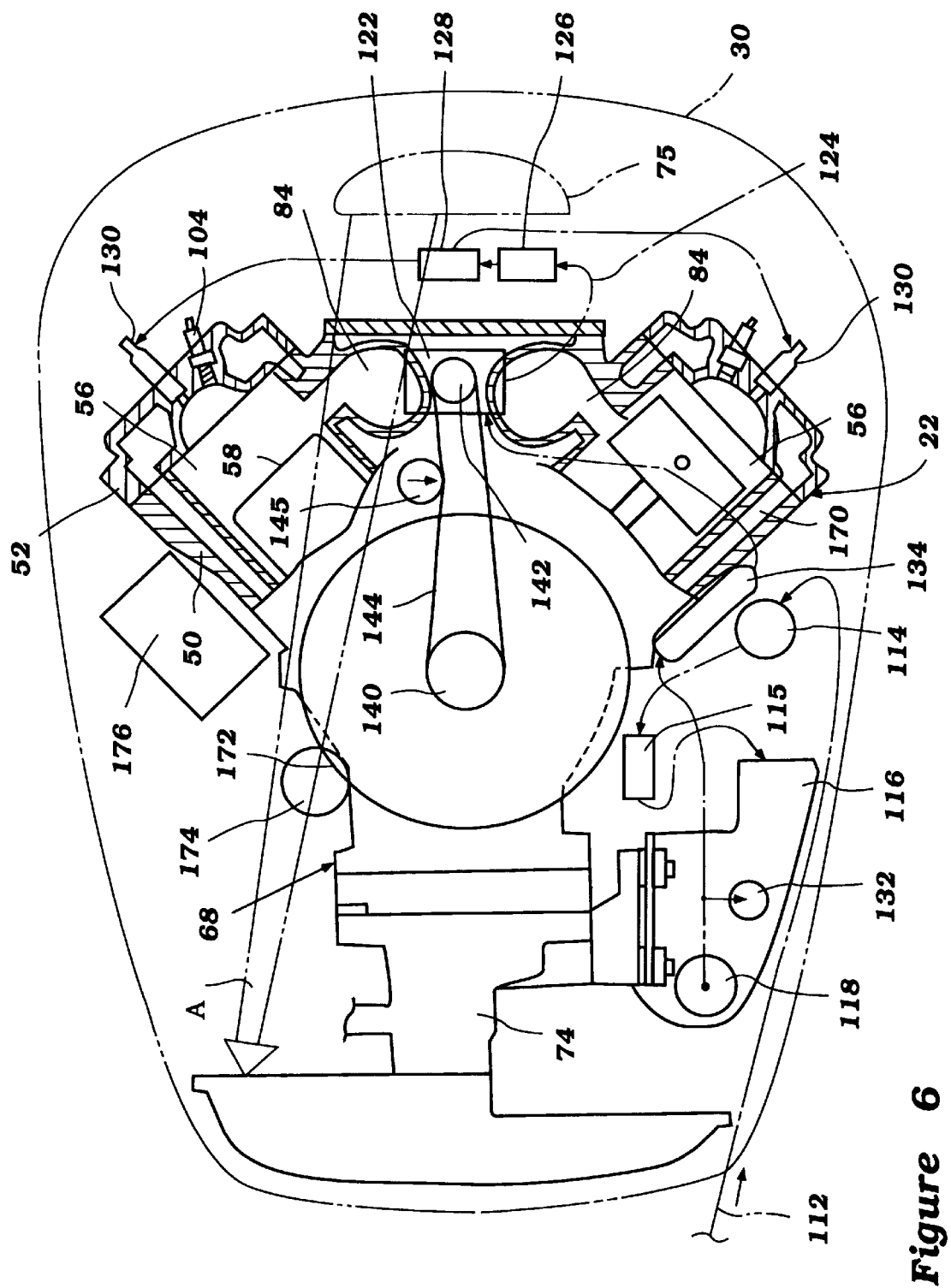
FIG. 6 is a cross-section top view of the motor illustrated in FIG. 1, illustrating a portion of the fuel injection system.

As illustrated in FIG. 6, the engine 22 is preferably mounted within the cowling 30 so that its cylinders 54 are generally horizontally extending. So arranged, the crankshaft 64 is generally vertically extending. The crankshaft 64 is arranged to drive a means for propelling the watercraft. Preferably, and as illustrated in FIG. 1, this means comprises a propeller 70.

In this arrangement, a lower end of the crankshaft 64 is connected to a top end of a drive shaft 67 which extends downwardly through the lower unit 34, where it drives a bevel gear associated with a conventional forward-neutral-reverse transmission 71. A control (not shown) is preferably provided for allowing an operator to remotely control the transmission from the watercraft 24.

A propeller shaft 73 is selectively driven by the transmission 71, the shaft journalled within the lower section 40 of the lower unit 34 in a known manner. A hub of the propeller 70 is coupled to the drive shaft, whereby rotation of the propeller moves water which effectuates movement of the watercraft 24.

As illustrated in FIGS. 4 and 6, the engine 22 includes an intake system 72 for providing air to each cylinder 54. Air "A" is drawn from outside the cowling 30 of the motor through a vent 75 (see FIG. 1) into an inlet of the intake system 72. Air passing through the air intake is divided and passes through a passage 74 (such as defined in a throttle body and runner) corresponding to each cylinder 54.

Means are provided for controlling the flow rate of air to each cylinder 54. Preferably, this means comprises a throttle valve 76 movably positioned in each passage. Each valve 76 preferably comprises a butterfly-type valve which is controlled remotely by the operator of the watercraft 24.

Each intake passage 74 leads to a chamber within the crankcase 66 corresponding to one of the cylinders 54. A reed-valve 78 is preferably provided in each intake passage 74 for permitting only one-way passage of the air into each crankcase chamber.

As stated above, the engine 22 operates on the well known two-cycle principle. As such, during a crankcase compression cycle, air within the crankcase chamber is compressed and flows through one or more scavenge passages 80 leading from the chamber into the cylinder 54.

As described in more detail below, a fuel supply system provides fuel to each cylinder 54 for combustion therein with the air supplied as stated above.

Referring again to FIG. 2, exhaust generated during the combustion process is routed from each cylinder 54 through an exhaust port 82. Each exhaust port 82 comprises a passage leading through the engine block 50 from cylinder 54. Each exhaust port 82 for the cylinders 54 of each bank join into a common exhaust passage 84. These common exhaust passages 84 lead through the "v" between the cylinder banks downwardly to the bottom end of the engine 22.

Means are provided for routing the exhaust from the bottom of the engine 22 to a point external to the motor 20. Preferably, the engine 22 is positioned above an exhaust guide 85 within the motor 20. A pair of passages 86 extend through the exhaust guide 85 corresponding to the common exhaust passages 84 leading through the engine 22.

A muffler 90 is positioned in the upper section 38 of the lower unit 34. An exhaust pipe 88 extends down from each passage 86 through the exhaust guide 85 into the muffler 90 for directing the exhaust into the muffler 90. Exhaust from each exhaust pipe 88 is kept separate by a divider 92, with the exhaust from each exhaust pipe 88 directed into one of two exhaust expansion areas 94 defined within the muffler 90. The exhaust is routed from the muffler 90 through an exhaust passage 96 extending through the lower section 40 of the lower unit 40 to a through the hub discharge of the propeller 70.

As illustrated in FIG. 3, a cover 100 extends over each cylinder head 52. Bolts 102 or other fasteners are used to connect the cover 100, head 52 and block 50.

Still referring to FIG. 3, means are provided for igniting the air and fuel supplied to each cylinder 54. Preferably, this means comprises a spark plug 104 having its electrode 105 positioned within the combustion chamber 56 of the cylinder 54. An ignition circuit, as is known to those skilled in the art, is provided for inducing a spark at the electrode tip 105 of the spark plug 104 at a determined time for ignition an air and fuel mixture within the cylinder 54.

Figure 5:
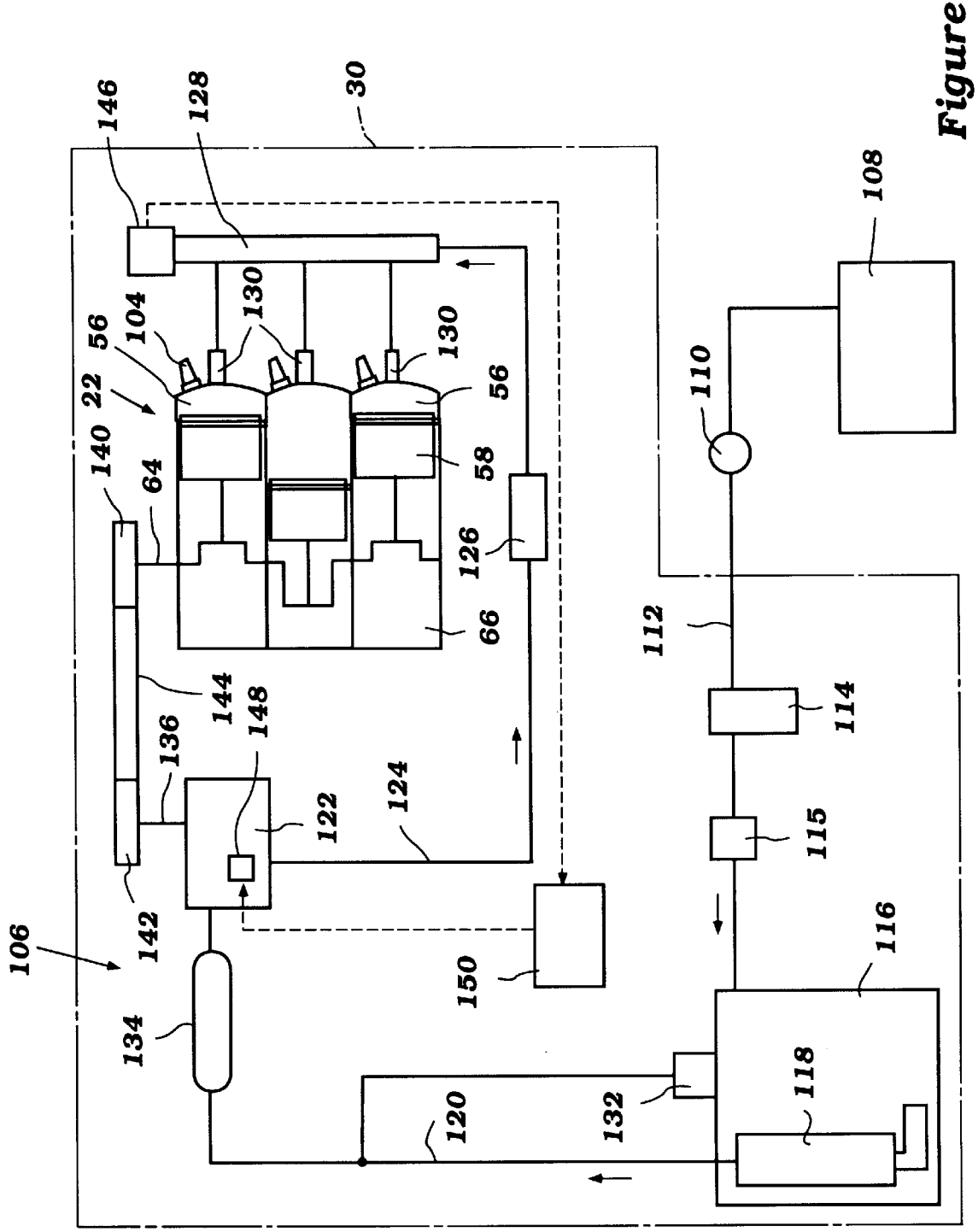
FIG. 5 is a schematic illustrating a fuel injection system in accordance with a first embodiment of the present invention.

In accordance with a first embodiment of the present invention, and as best illustrated in FIG. 5, a fuel injection system 106 provides fuel to each cylinder 54 for combustion therein. The fuel injection system 106 draws fuel from a fuel supply or source, such as a fuel tank 108 or reservoir. As illustrated, the tank 108 is positioned within the hull 36 of the watercraft 24. A first low pressure or primer type pump 110 is positioned along a fuel delivery line 112 leading from the tank 108. The delivery line 112 leads through the cowling 30 to a fuel filter 114, then a second low pressure pump 115 and then a vapor separator 116. Preferably, the second low pressure pump 115 is of the electrically operated variety.

The vapor separator 116 is utilized to remove air from the fuel, as is known in the art. The fuel is then pumped by a first or pre-pressurizing pump 118 through a line 120 to a high pressure pump 122. The first pressurizing pump 118 is preferably of the electrically-operated type and positioned within the vapor separator 116. The first pressurizing pump 118 pressurizes the fuel to a first pressure above the pressure of the fuel within the vapor separator 116.

Means are provided for driving the second high pressure pump 122. As illustrated in FIG. 5, this means preferably comprises the crankshaft 64. The second high pressure pump 122 is driven by a shaft 136 which is itself driven by the crankshaft 64. Means are provided for driving the shaft 136 with the crankshaft 64. Preferably, this means comprise a pulley 140 mounted on the crankshaft 64, a pulley 142 mounted on the shaft 136, and a flexible transmitter, such as a belt 144. The belt 144 is driven by the pulley 140 on the crankshaft 64 and drives the pulley 142 mounted on the shaft 136. A tensioner pulley 145 may be provided for tensioning the belt 144.

Of course, as appreciated by one skilled in the art, other drive means may be used, such as interengaging gears or the like.

The second high pressure pump 122 pressurizes the fuel to a second pressure above the first pressure and delivers it through a main delivery line 124 through a fuel filter 126 to a high pressure fuel rail 128. A fuel injector 130 is provided corresponding to each cylinder 54, as illustrated in FIG. 3, and is arranged to spray fuel F into the cylinder 54. Fuel is supplied to each fuel injector 130 from the fuel rail 128.

In accordance with the fuel injection system 106 of the present invention the first pressurizing pump 118 pre-pressurizes the fuel, so that the high pressure pump 122 need not further pressurize the fuel in as great of a pressure rise to reach the desired fuel supply pressure.

As also illustrated in FIG. 5, some of the fuel delivered by the first pressurizing pump 118 is diverted through a pressure-activated valve 132 from the delivery line 120 back to the vapor separator 116. Preferably, this valve 132 is activated at medium pressure levels, and serves to route some of the more vapor laden fuel back to the vapor separator 116.

In addition, a fuel cooling device 134 is provided along the delivery line 120. This device 134 is arranged to lower the temperature of the fuel passing through the line 120, and thus lower its susceptibility to vapor formation and the vapor content within the line.

Still referring to FIG. 5, means are provided for controlling the rate of flow of fuel from the second high pressure pump 122 to the fuel rail 128, and thus the pressure within the fuel rail. Preferably, this means comprises a by-pass for diverting fuel from the pump 122 from being delivered to the fuel rail 128.

Figure 7:
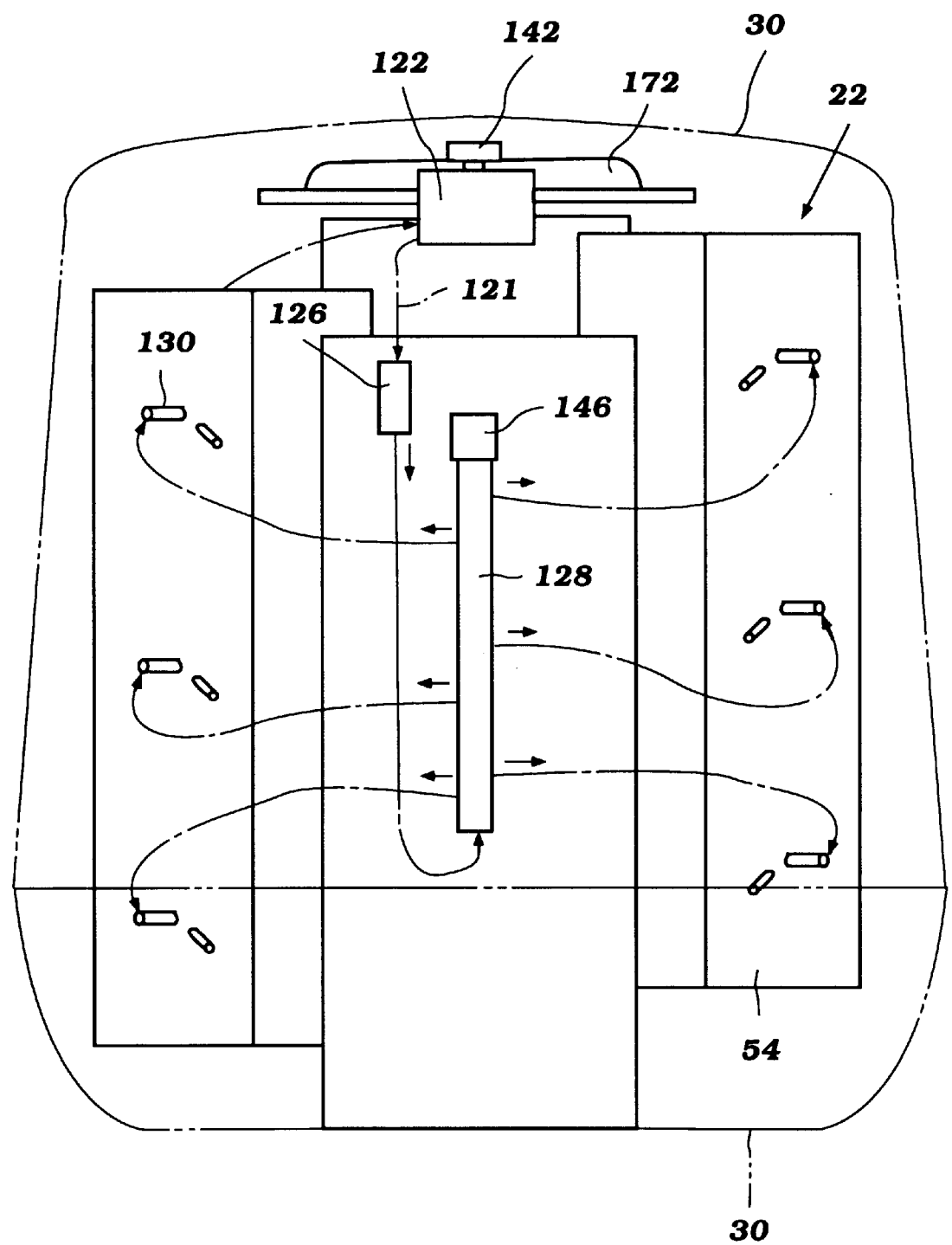
FIG. 7 is an end view of the engine of the motor illustrated in FIG. 1, with a cowling of the motor in which the engine is positioned illustrated in phantom.

As illustrated, a pressure sensor 146 is provided along the fuel rail 128, preferably at its end opposite the connection of the main delivery line 124 and downstream of the injectors 130. Preferably, a single fuel rail 130 is provided for supplying fuel to all of the injectors 130 of the engine 22, this fuel rail 130 extending generally vertically between the cylinder banks, as illustrated in FIG. 7. The main delivery line 124 preferably connects to the lower end of the rail 130, while the pressure sensor 146 is provided at the top end of the fuel rail.

Figure 8:
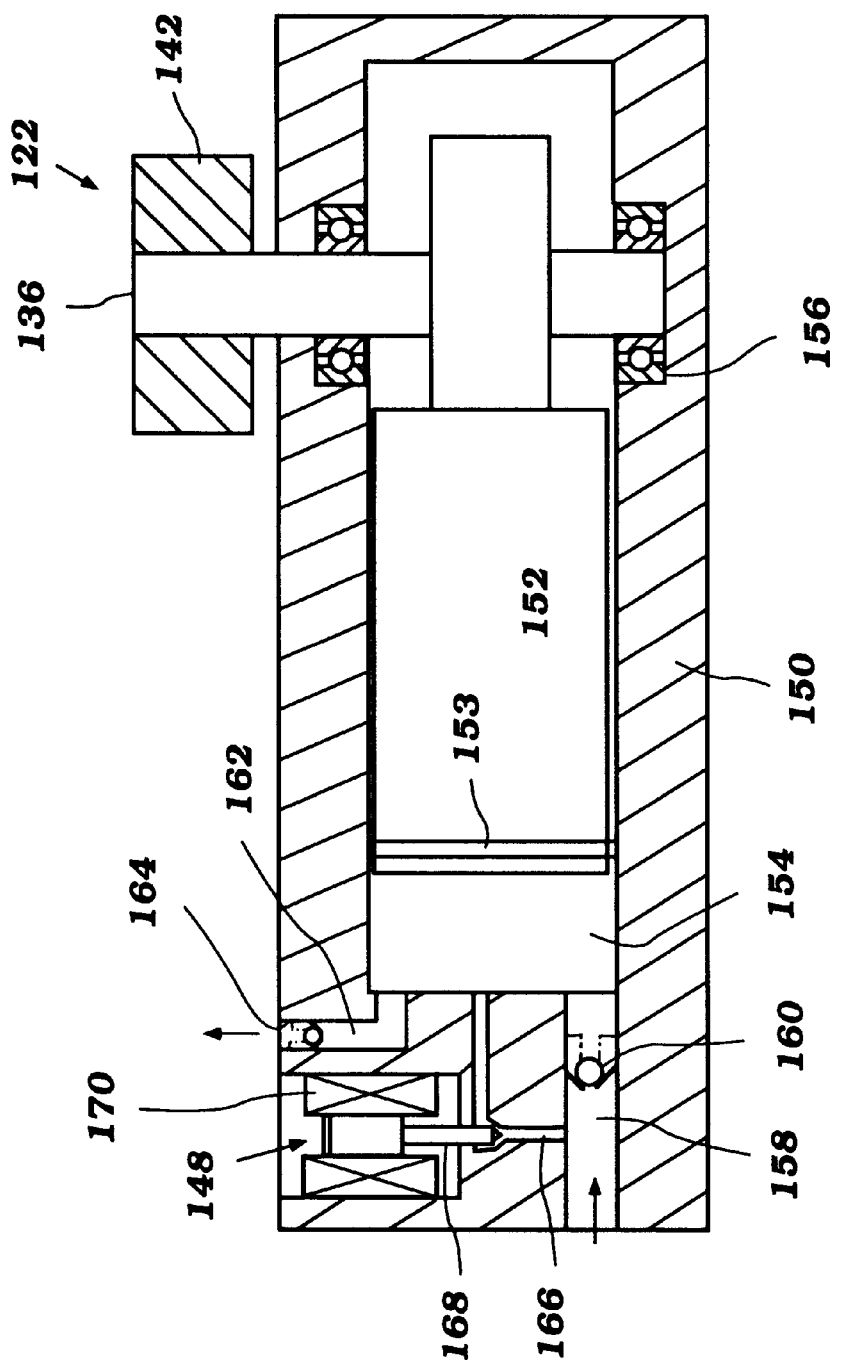
FIG. 8 is a cross-sectional view of a high pressure pump of the fuel injection system in accordance with the first embodiment of the invention.

The means also includes a solenoid operated valve 148. This valve 148 is best illustrated in FIG. 8. As illustrated therein, the pump 122 includes a housing 150 defining a chamber 154 in which is reciprocally mounted a plunger or piston 152. As described above, but illustrated in more detail in FIG. 8, the piston 152 is driven by a shaft 136 which is driven by the crankshaft 64. The shaft 136 has an end which is journalled for rotation with respect to the housing 150 by a bearing 156. The piston 152 is arranged to be driven by the shaft 136 and reciprocate with the chamber 154, and has a seal 153 thereon for preventing fuel from passing from a portion of the chamber in front of the piston towards the end housing the shaft 136.

Fuel enters the chamber 154 through a passage 168 (leading from delivery line 120) through a one-way check valve 160. Fuel which enters the chamber 154 is pressurized by the piston 152 and, not being permitted to flow back through the check valve 160, flows through an outlet passage 162 to the main delivery line 124. A check valve 164 is provided along this passage 162 for preventing the pump 122 from drawing fuel from the line 124 back into the chamber 154.

The solenoid operated valve 148 includes a diverting or bypass passage 166, a piston 168, and a solenoid 170. The bypass passage 166 extends from the chamber 154 to the inlet passage 158 upstream of the check valve 160. The piston 168 is moved through energization of the solenoid 170, and is arranged to selectively open and close the bypass passage 166, as illustrated.

The means also includes an electronic control unit (ECU) 150 for controlling the valve 148 based on the output of the pressure sensor 146. The ECU 150 receives a signal from the sensor 146 regarding the pressure of the fuel within the fuel rail 128. When the pressure is low, the ECU 150 is arranged to move the piston 160 to a position in which it closes the by-pass passage 166. In this position, all of the fuel pumped by the pump 122 must flow through the outlet passage 162 to the fuel rail 128.

On the other hand, when the pressure is high, the ECU 150 may move the piston 168 of the valve 148 to a position in which the by-pass passage 166 is opened. In this position, some of the fuel pumped by the pump 122 passes through the by-pass passage 166 back into the passage 158 (and back into the fuel delivery line 120, and if the pressure is high enough to open the valve 132, back to the vapor separator 116). Since less fuel is pumped to the fuel rail 128, the pressure of the fuel within the rail falls.

The fuel injection system has a number of advantages. First and foremost, the system includes a means for controlling the pressure of the fuel within the fuel rail 128. In this fashion, the rate of fuel delivery by the injectors 130 can be accurately controlled.

The particular mechanism by which the fuel pressure is varied has the benefit that the fuel pressure is accurately monitored (by sensor 146) and the pressure is continuously variable simply by use of the bypass valve 148. At the same time, the fuel pressure is variable without the need for a complex variably electrically powered high pressure pump and control. Instead, a reliable mechanical fuel pump 122 is used. The ECU 150 is arranged to control the valve 148 in a manner so that the rate of fuel delivery by the injectors 130 is optimized at a given engine or motor condition. Thus, when the engine speed, and thus pump speed increases, the ECU 150 can be arranged to divert a portion of the fuel to ensure that the pressure does not become too high in the fuel rail 128.

Though not constituting a portion of the invention herein per se, the motor 20 may include a number of other elements. Referring to FIG. 6, the motor 20 preferably includes a cooling system which routes coolant through one or more coolant jackets 170 of the engine 22.

A flywheel 172 is mounted to the crankshaft 64 at the top end of the engine 22. As illustrated in FIG. 7, the flywheel 172 is positioned below the drive pulley 140 of the pump 122 drive, which pulley 140 is also mounted on the crankshaft 64.

An electrically powered starter motor 174 is provided for starting the engine 22. As illustrated, the motor 174 has a pinion gear arranged to engage teeth positioned on the periphery of the flywheel 172. As such, the starter motor 174 is positioned generally near the top end of the engine 22.

An electrical box 176 houses various electrical components, such as the ECU 150. This box 176 is mounted along the engine 22 in a space defined by the cylinder block 52, one of the heads 54, and the cowling 30.

The particular arrangement of the fuel system components is also illustrated in detail in FIG. 6. As illustrated, the first filter 114, second low pressure pump 115, separator 116, first high pressure pump 118, and fuel cooler 134 are all mounted on the side of the engine 22 generally opposite the starter 174 and electrical box 176 in a space defined between the engine and cowling 22. On the other hand, the second high pressure pump 122, fuel rail 128 and second filter 126 are all generally mounted at the end of the engine 22 between the cylinder banks (and thus opposite the intake system).

The above-described arrangement is preferred since it provides for a small engine profile, and thus smaller overall motor 20 size. Those of skill in the art will appreciate, however, the fuel system and other components may be arranged in other fashions.

Figure 9:
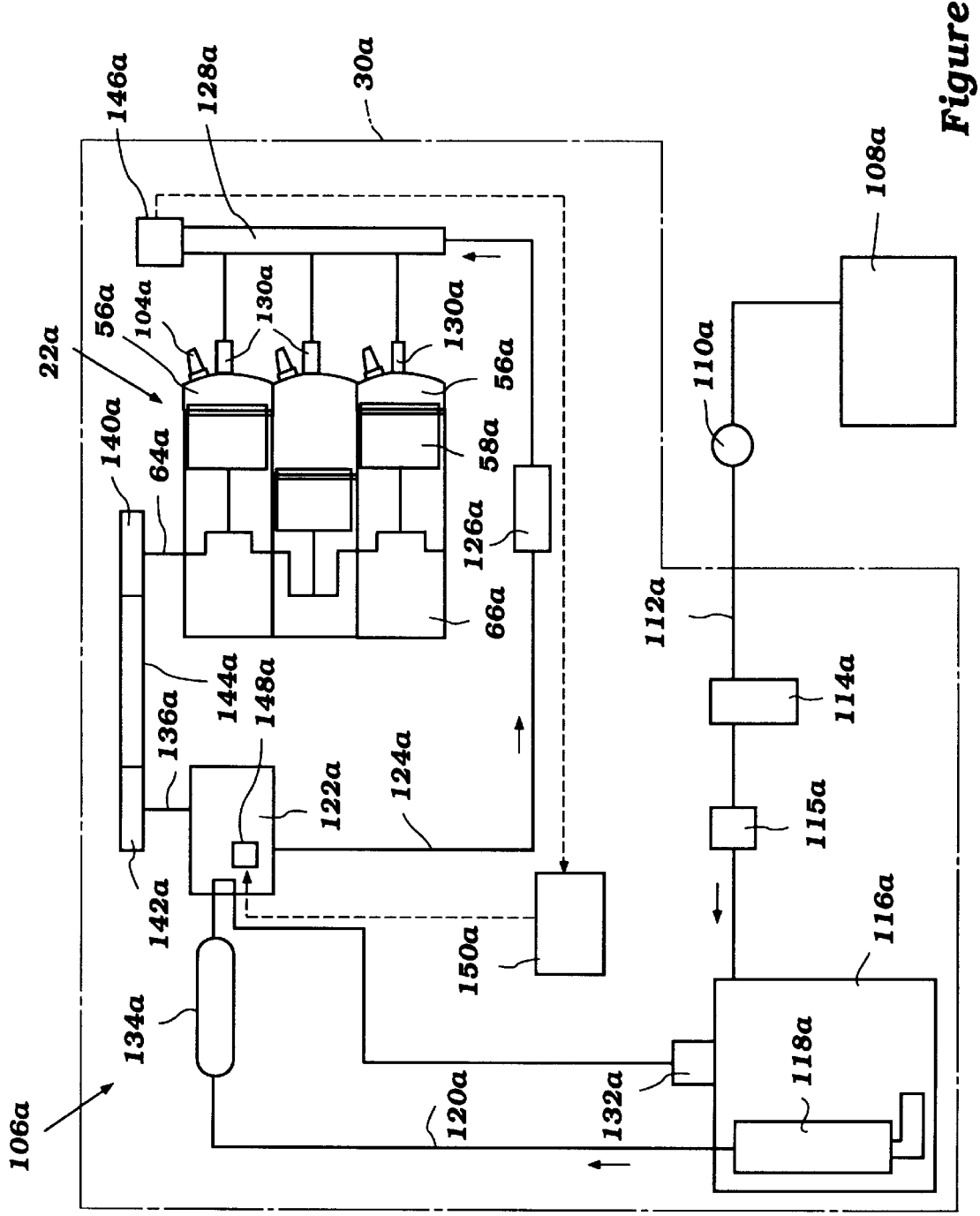
FIG. 9 is a schematic illustrating a fuel injection system in accordance with a second embodiment of the present invention.

A second embodiment fuel injection system 106*a* is illustrated in FIG. 9. In the description and illustration of this embodiment, similar parts have been given like reference numerals to those used in the embodiment described above and illustrated in FIGS. 1–8, except that an "a" designator has been added thereto.

As illustrated, this embodiment fuel injection system is generally identical to that described above and illustrated in FIGS. 1–8. In this embodiment, however, the by-pass of the valve 148*a* is arranged to divert fuel directly into a line extending back to the vapor separator 116*a*.

In the previous embodiment, the by-pass diverted fuel back into the inlet passage leading to the second high pressure pump, forcing fuel back through the line (120) including the fuel cooler before being diverted to the vapor separator. In this embodiment, the fuel is by-passed directly to a line extending to the vapor separator 116*a* (but still having a pressure valve 132*a* positioned therealong).

This arrangement helps prevent the creation of fuel vapor and the like in the line leading to the high pressure pump 122*a*, since the by-passed fuel is not pushed back into the delivery line 120*a*, and any by-passed fuel must first pass through the vapor separator 116*a* before being re-delivered to the pump 122*a*.

Those of skill in the art will appreciate that a variety of arrangements may be provided for bypassing the fuel to control the fuel pressure.

Figure 10:
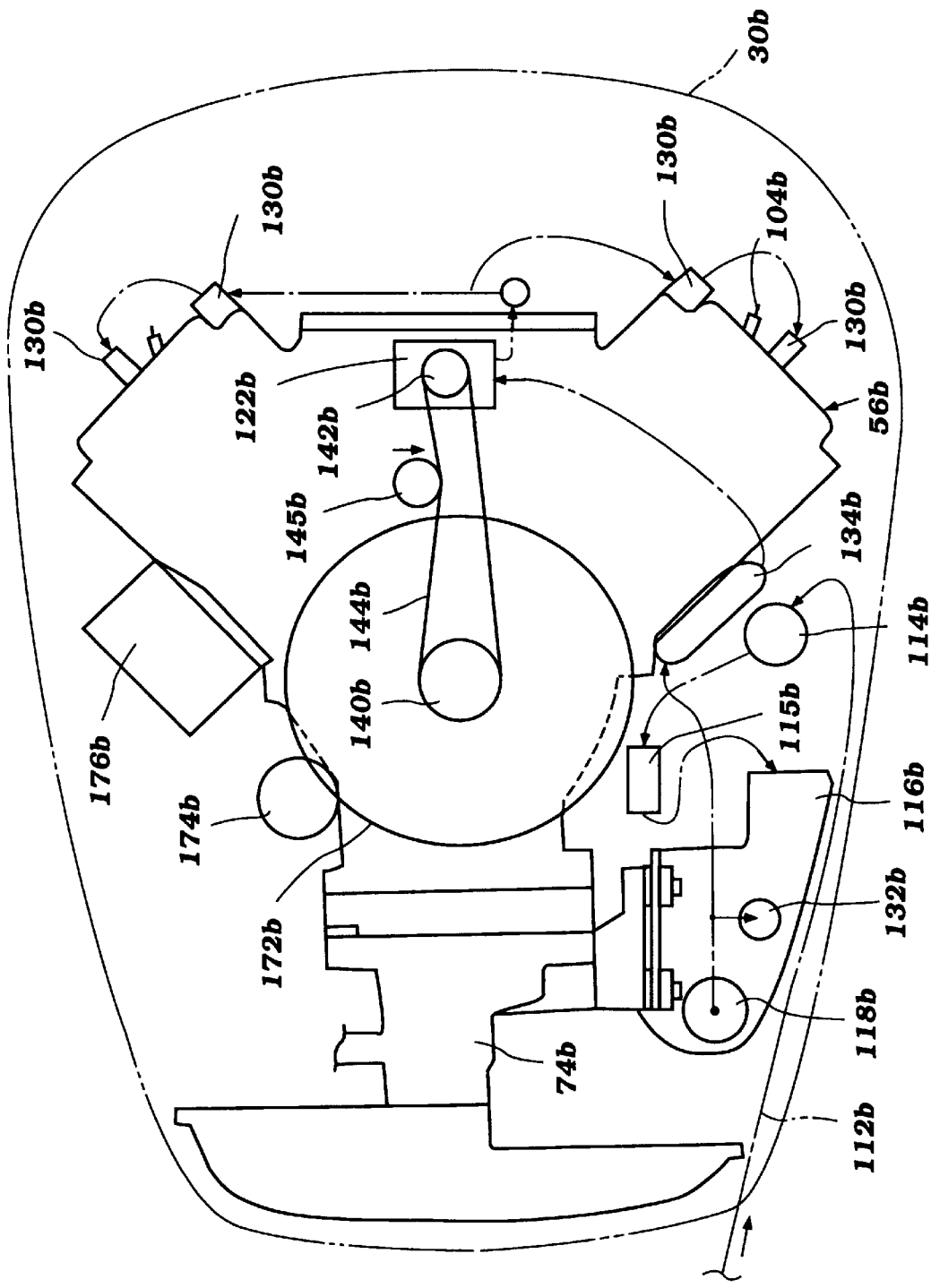
FIG. 10 is a cross-sectional top view of an outboard motor powered by an engine and having a fuel injection system in accordance with a third embodiment of the present invention.
Figure 11:
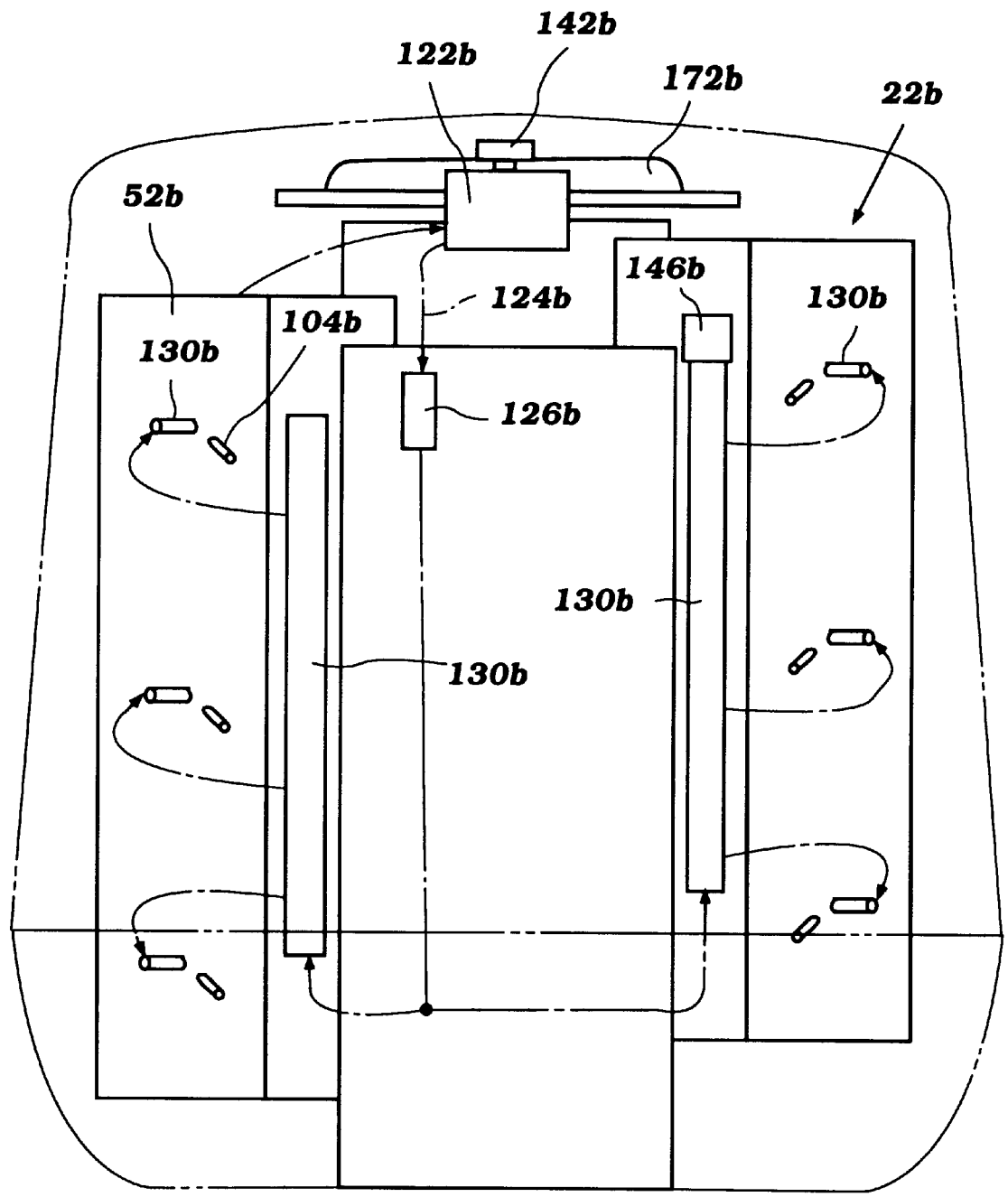
FIG. 11 is an end view of the engine of the motor illustrated in FIG. 10, with a cowling of the motor in which the engine is positioned illustrated in phantom.

A third embodiment fuel injection system 106*b* is illustrated in FIGS. 10–11. In the description and illustration of this embodiment, similar parts have been given like reference numerals to those used in the above embodiments, except that a "b" designator has been added thereto.

In this embodiment, a fuel rail 130*b* is provided corresponding to each bank of cylinders. Referring to FIG. 11, fuel is routed through the main delivery line 124*b*, which splits in two, to each of the fuel rails 130*b*. In this arrangement, a pressure sensor 146*b* is preferably provided corresponding to at least one of the rail 130*b* and mounted at a top end thereof.

In the embodiments of the invention described above, it should be understood that the various fuel lines may comprise any number of materials as known to those skilled in the art. For example, the fuel lines may comprise rubber hose, metal piping, and even one or more passages formed within a portion of the engine such as the cylinder block.

Of course, the foregoing description is that of preferred embodiments of the invention, and various changes and modifications may be made without departing from the spirit and scope of the invention, as defined by the appended claims.

What is claimed is:

1. A fuel injection system for supplying fuel from a fuel source to an internal combustion engine having at least one combustion chamber, said fuel injection system comprising at least one fuel injector for supplying fuel to said combustion chamber of said engine, a first, electrical fuel pump for supplying fuel from said fuel source to a second higher pressure, mechanical pump driven by said engine for delivering fuel at high pressure to at least one fuel rail arranged to deliver fuel under high pressure to said at least one fuel injector, a vapor separator for separating vapor from fuel passing through said fuel injection system, a first pressure regulator for regulating the pressure of fuel supplied from said electrical fuel pump to said mechanical pump by delivering fuel to said vapor separator, means for detecting a pressure of the fuel in said fuel rail, and means for diverting a portion of the fuel pumped by said mechanical pump away from said fuel rail based upon said fuel pressure detected by said means for detecting.

2. The fuel injection system in accordance with claim 1, wherein said means for detecting comprises a pressure sensor.

3. The fuel injection system in accordance with claim 1, wherein said mechanical pump has a pumping chamber, a first fuel supply line leads to said pumping chamber from said electric fuel pump and said means for diverting comprises a bypass passage leading from said pumping chamber back to said first fuel supply line and a valve for selectively opening and closing said bypass passage.

4. The fuel injection system in accordance with claim 3, further including a second fuel supply line leading from said pumping chamber to said fuel rail.

5. The fuel injection system in accordance with claim 3, wherein said valve is a solenoid actuated valve.

6. The fuel injection system in accordance with claim 1, wherein said mechanical pump has a pumping chamber, a first fuel supply line leads to said pumping chamber from said electric fuel pump and said means for diverting comprises a bypass passage leading from said pumping chamber to a return line leading from said mechanical pump and a valve for selectively opening and closing said bypass passage.

7. The fuel injection system in accordance with claim 1, wherein said engine has a vertically extending crankshaft and said fuel rail is vertically extending, and wherein said means for detecting comprises a pressure sensor mounted at a top end of said fuel rail.

8. The fuel injection system in accordance with claim 1, wherein said engine a first cylinder bank with at least one combustion chamber and a second cylinder bank with at least one combustion chamber, a first fuel rail corresponding to said first cylinder bank and a second fuel rail corresponding to said second cylinder bank, and wherein said means for detecting comprises a pressure sensor associated with one of said fuel rails.

9. The fuel injection system in accordance with claim 8, wherein said each of said first and second fuel rails are generally vertically extending and said pressure sensor is mounted at a top end of said rail.

10. The fuel injection system in accordance with claim 6 wherein the return line delivers the fuel to the vapor separator.

* * * * *